United States Patent [19]

Basinski, Jr.

[11] 4,310,121
[45] Jan. 12, 1982

[54] EXHAUST NOZZLE ACTUATION ASSEMBLY

[75] Inventor: Edward M. Basinski, Jr., Enfield, Conn.

[73] Assignee: The United States of America as represented by the Secretary of the Air Force, Washington, D.C.

[21] Appl. No.: 154,720

[22] Filed: May 30, 1980

[51] Int. Cl.³ .............................................. B64C 15/04
[52] U.S. Cl. ................................................ 239/265.33
[58] Field of Search ...................... 239/265.19–265.41; 60/228, 232, 233; 244/110 R, 110 B

[56] References Cited

U.S. PATENT DOCUMENTS

| | | | |
|---|---|---|---|
| 2,770,944 | 11/1956 | Jordan et al. | 239/265.33 X |
| 3,237,864 | 3/1966 | Taylor et al. | 239/127.3 |
| 3,391,869 | 7/1968 | Glass | 239/265.19 |
| 3,612,400 | 10/1971 | Johnson | 239/265.19 |
| 3,722,797 | 3/1973 | Hammill | 239/265.17 |
| 3,873,027 | 3/1975 | Camboulives et al. | 239/265.33 |
| 4,074,859 | 2/1978 | Lowman | 239/265.33 |

Primary Examiner—Robert B. Reeves
Assistant Examiner—Gene A. Church
Attorney, Agent, or Firm—Donald J. Singer; Arsen Tashjian

[57] ABSTRACT

An actuation assembly for selectively varying the throat area of a convergent-divergent exhaust nozzle of a gas turbine engine and simultaneously achieving predetermined fixed ratios of throat area versus exit area. The assembly structurally comprises a plurality of constituent components (including a linear actuator member on the port side, and another on the starboard side, of the nozzle in parallel spaced-apart relationship with the centerline common to the engine and to the exhaust nozzle) that interact and cooperate to pivot the convergent flaps to reduce the throat area while simultaneously moving the divergent flaps inwardly, or to pivot the convergent flaps to increase the throat area while simultaneously moving the divergent flaps outwardly, as desired, thereby permitting the selective varying of the throat area while attaining a predetermined fixed ratio of the throat area to the exit area of the convergent-divergent exhaust nozzle. In addition, and unlike the prior art, the respective lengths of linear movements required to effectuate either the convergent flaps from a minimum throat area position to a maximum throat area position or the divergent flaps from a minimum exit area position to a maximum exit area position are equal, as are the respective lengths in the converse. Thusly, only a single actuator per side is required.

9 Claims, 2 Drawing Figures

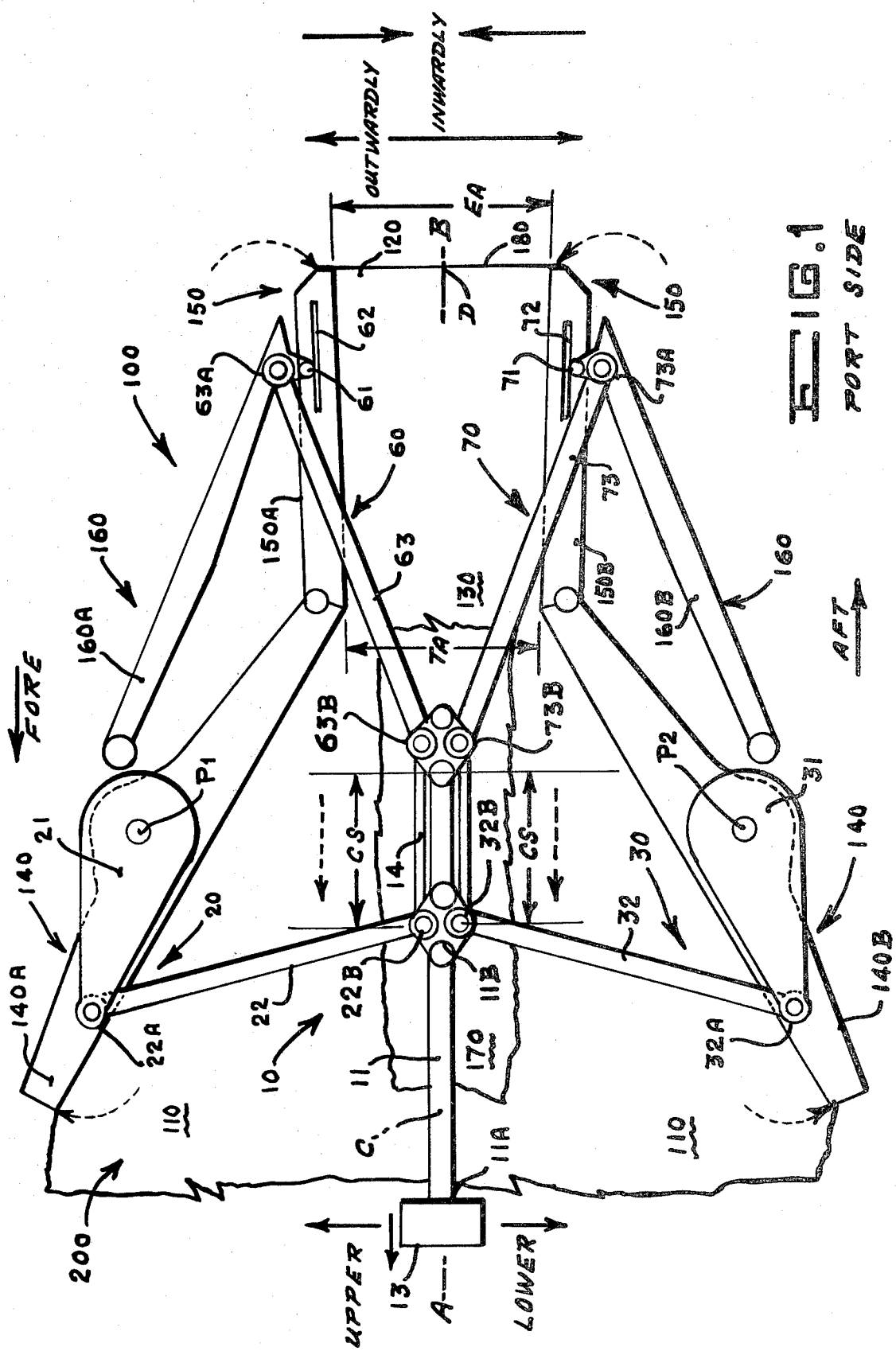

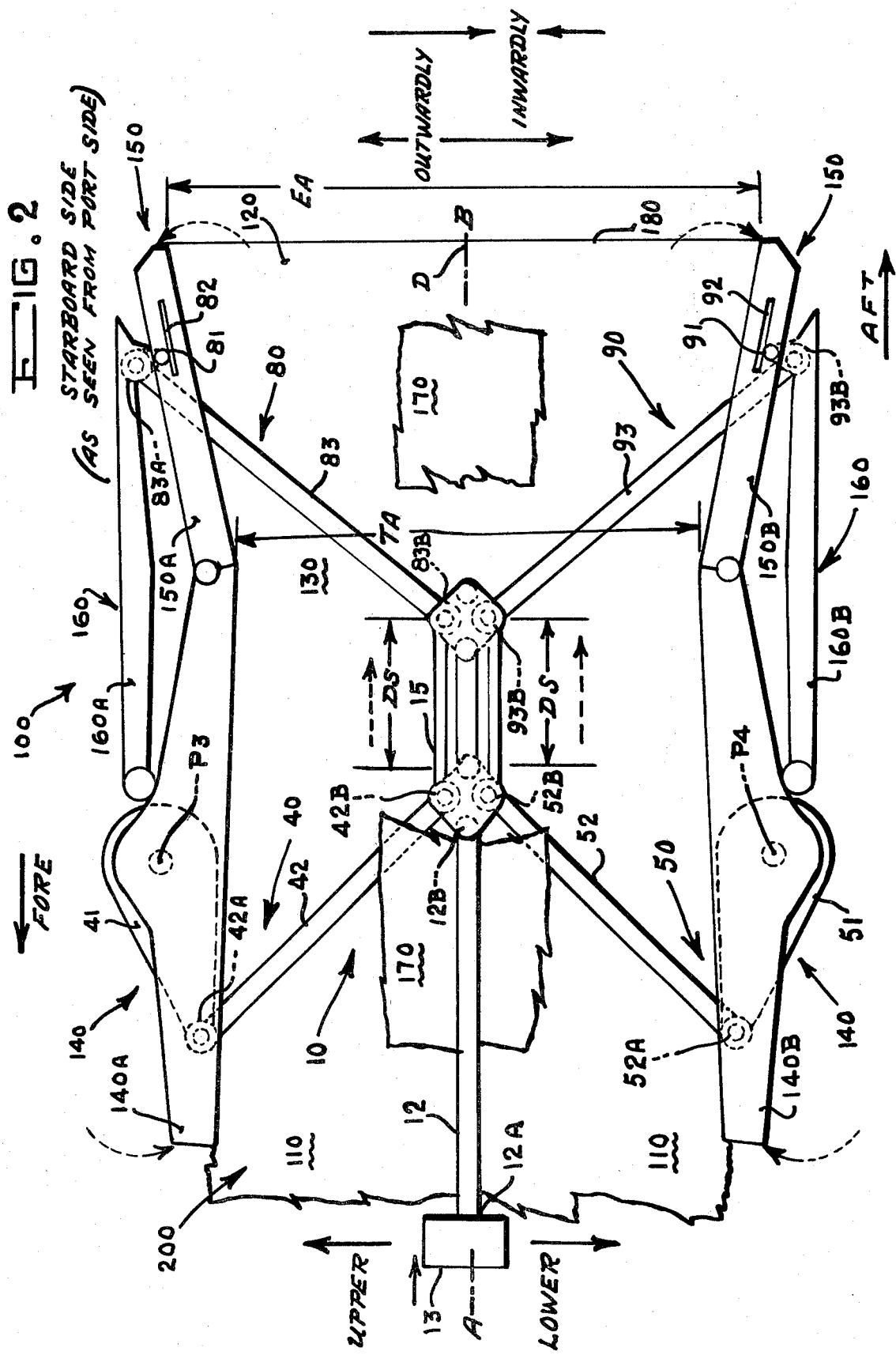

EXHAUST NOZZLE ACTUATION ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to an actuation assembly for a convergent-divergent exhaust nozzle of a gas turbine engine and, more particularly, to an actuation assembly for selectively varying the throat area (and, simultaneously, the exit area) of the nozzle from maximum to minimum and vice versa.

Actuation assemblies per se of gas turbine engine are well known, as is the goal of reduction of weight of the actuation assemblies. In that regard, it is to be noted that in the prior art, and particularly with regard to exhaust nozzles that are non-axisymmetrical (i.e., sometimes referred to as "2D"), at least four actuators have been needed to effectuate the varying of the throat area and of the exit (or exhaust) area. Typically, at least two actuators are needed on the port side, and at least two actuators are needed on the starboard side, to effectuate the desired movement of the convergent and divergent flaps in order to attain the desired throat area, exit area, and ratios thereof.

The use of my invention in which only two actuators are needed (i.e., one for the port side, and one for the starboard side) results not only in selectively varying the desired throat area, exit area, and ratios thereof, but also results in the significant reduction in weight of the inventive actuation assembly. I have, thereby, significantly advanced the state-of-the-art.

SUMMARY OF THE INVENTION

This invention pertains to an actuation assembly for a convergent-divergent exhaust nozzle of a gas turbine engine, in which said assembly only two linear actuator members (rather than a minimum of four such actuator members) are needed.

Accordingly, the principal object of this invention is to provide said simple actuation system for said convergent-divergent nozzle.

This principal object, as well as related objects, of this invention will become readily apparent after a consideration of the description of the invention, together with reference to the contents of the Figures of the drawings.

DESCRIPTION OF THE DRAWINGS

FIG. 1 is a side elevation view from the port side, in simplified pictorial and schematic form, and partially fragmented, of the preferred embodiment of the invention, in its working environment, at the end of the linear forward stroke, i.e., to effectuate the minimum throat area and specific area ratio as required; and FIG. 2 is a side elevation view, also in simplified pictorial and schematic form, and also partially fragmented, of the preferred embodiment of the invention, in its working environment, at the end of the linear aftward stroke, i.e., to effectuate the maximum throat area and specific area ratio as required.

DESCRIPTION OF THE PREFERRED EMBODIMENT

With reference to FIGS. 1 and 2, therein is shown in various views, the preferred embodiment 10 of my invention in its working environment.

As a preliminary matter, and with reference to FIGS. 1 and 2, it is to be remembered that my invention 10 is for use with a convergent-divergent exhaust nozzle 100 of a gas turbine engine 200 having a longitudinal axis A–B (i.e., the centerline), where the nozzle 100 has a longitudinal axis C–D (i.e., the centerline) which is coincident with the longitudinal axis A–B of the engine 200, a fore end (generally designated 110), an aft end (generally designated 120), a throat 130 having an area (generally designated TA and schematically represented in one dimension, rather than two dimensions, by a dimension line, as shown) convergent flap system 140 with an upper portion 140A and an lower portion 140B, a divergent flap system 150 with an upper portion 150A and a lower portion 150B, an external flap system 160 with an upper portion 160A and a lower portion 160B, an inner wall 170, a port side as legended, a starboard side as legended, and an exit 180 having an area (generally designated EA and schematically represented in one dimension, rather than two dimensions, by a dimension line, as shown).

In its most basic and generic structural form, my invention 10 comprises: a first linear actuator member 11, FIG. 1, that is disposed parallel to, and is in equal spaced-apart relationship with, the horizontal axis (i.e., the centerline) B–D of the nozzle 100, FIG. 1, with this member 11 being also disposed external of the inner wall 170, FIG. 1, on the port side (FIG. 1) of the engine 200, and with this member 11 having a first end 11A and a second end 11B; a second linear actuator member 12, FIG. 2, that is disposed parallel to, and is in equal spaced-apart relationship with, the horizontal axis (i.e., the centerline) B–D of the nozzle 100, FIG. 2, with this member 12 being also disposed external of the inner wall 170, FIG. 2, on the starboard side (FIG. 2) of the engine 200, and with this member 12 having a first end 12A and a second end 12B; a means 13, FIGS. 1 and 2, that is common to the first and second linear actuator members 11 and 12, for selectively, simultaneously, and linearly moving the first and second linear actuator members 11 and 12 toward the fore end 110, FIGS. 1 and 2, of the nozzle 100 and/or toward the aft end 120, FIGS. 1 and 2, of the nozzle 100, with this means 13 being connected to the first end 11A of the first linear actuator member 11, FIG. 1, and with this means 13 being also connected to the first end 12A of the second linear actuator member 12, FIG. 2; a first sliding carriage member 14, FIG. 1, that is disposed parallel to, and also in equal spaced-apart relationship with, the horizontal axis (i.e., the centerline) B–D of the nozzle 100, with this member 14 being also disposed external of the inner wall 170, FIG. 1, on the port side (FIG. 1) of the engine 200, and with this member 14 connected to the second end 11B of the first linear actuator member 11, FIG. 1; a second sliding carriage member 15, FIG. 2, that is disposed parallel to, and also in equal spaced-apart relationship with, the horizontal axis (i.e., the centerline) B–D of the nozzle 100, with this member 15 being also disposed external of the inner wall 170, FIG. 2, on the starboard side (FIG. 2) of the engine 200, and with this member 15 connected to the second end 12B of the second linear actuator member 12, FIG. 2; a first means 20, FIG. 1, for pivoting (i.e., rotating about pivot point P1, FIG. 1, in effect increasing or decreasing the throat area) the upper portion 140A of the convergent flap system 140, FIG. 1, with this means 20 disposed external of the inner wall 170, FIG. 1, on the port side (FIG. 1) of the engine 200, and with this means 20 connected to the upper portion 140A of the convergent flap system 140, and with this means 20 also pivotally connected to the first sliding carriage member 14, FIG. 1; a first means 30, FIG. 1, for pivoting (i.e., rotating about pivot point P2, FIG. 1, in effect increasing or decreasing the throat area) the lower portion 140B of convergent flap system 140, FIG. 1, with this means 30 disposed external of the inner wall 170, FIG. 1, on the port side (FIG. 1) of the engine 200, and with this means 30 connected to the lower portion 140B of the convergent flap system 140, and with this means 30 also pivotally connected to the first sliding carriage member 14, FIG. 1; a second means 40, FIG. 2, for pivoting (i.e., rotating about pivot point P3, FIG. 2, in effect increasing or decreasing the throat area) the upper portion 140A of the convergent flap system 140, FIG. 2, with this means 40 disposed external of the inner wall 170, FIG. 2, on the starboard side (FIG. 2) of the engine 200, and with this means 40 connected to the upper portion 140A of the convergent flap system 140, FIG. 2, and with this means 40 also pivotally connected to the second sliding carriage member 15, FIG. 2; a second means 50, FIG. 2, for pivoting (i.e. rotating about pivot point P4, FIG. 2, in effect increasing or decreasing the throat area) the lower portion 140B of the convergent flap system 140, FIG. 2, with this means 50 disposed external of the inner wall 170, FIG. 2, on the starboard side (FIG. 2) of the engine 200, and with this means 50 connected to the lower portion 140B of the convergent flap system 140, FIG. 2, and with this means 50 also pivotally connected to the second sliding carriage member 15, FIG. 2; a first means 60, FIG. 1, for moving outwardly and/or inwardly (i.e., away from or toward nozzle centerline C-D, FIG. 1) the upper portion 150A of the divergent flap system 150, FIG. 1, with this means 60 disposed external of the inner wall 170, FIG. 1, on the port side (FIG. 1) of the engine 200, and with this means 60 slideably connected to the upper portion 150A of the divergent flap system 150 and pivotally connected also to the first sliding carriage member 14, FIG. 1, and also simultaneously pivotally connected to the upper portion 160A of the external flap system 160, FIG. 1; a first means 70, FIG. 1, for moving outwardly and/or inwardly (i.e., away from or toward nozzle cenerline C-D, FIG. 1) the lower portion 150B of the divergent flap system 150, FIG. 1, with this means 70 disposed external of the inner wall 170, FIG. 1, on the port side (FIG. 1) of the engine 200, and with this means 70 slideably connected to the lower portion 150B of the divergent flap system 150 and pivotally connected also to the first sliding carriage member 14, FIG. 1, aand also simultaneously pivotally connected to the lower portion 160B of the external flap system 160, FIG. 1; a second means 80, FIG. 2, for moving outwardly and/or inwardly (i.e., away from or toward nozzle centerline C-D, FIG. 2), the upper portion 150A of the divergent flap system 150, FIG. 2, with this means 80 disposed external of the inner wall 170, FIG. 2, on the starboard side (FIG. 2) of the engine 200, and with this means 80 slideably connected to the upper portion 150A of the divergent flap system 150 and pivotally connected also to the second sliding carriage member 15, FIG. 2, and also simultaneously pivotally connected to the upper portion 160A of the external flap system 160, FIG. 2; and, a second means 90, FIG. 2, for moving outwardly and/or inwardly (i.e., away from or toward nozzle centerline C-D, FIG. 2) the lower portion 150B of the divergent flap system 150, FIG. 2, with this means 90 disposed external of the inner wall 170, FIG. 2, on the starboard side (FIG. 2) of the engine 200, and with this means 90 slideably connected to the lower portion 150B of the divergent flap system 150 and pivotally connected also to the second sliding carriage member 15, FIG. 2, and also simultaneously pivotally connected to the lower portion 160B of the external flap system 160, FIG. 2.

More specifically, and as a matter of preference and not of limitation, the first means 20, FIG. 1, for pivoting the upper portion 140A of the convergent flap system 140 includes a first bell crank member subassembly which comprises: a first bell crank member 21, FIG. 1, that is in fixed relation and connected to the upper portion 140A, FIG. 1, of the convergent flap system 140, that is on the port side (FIG. 1) of the engine 200; and, a first bell crank link member 22, FIG. 1, having a first end 22A, FIG. 1, that is pivotally and connected to the first bell crank member 21, and a second end 22B that is pivotally connected to the first sliding carriage member 14, FIG. 1. Similarly, the first means 30, FIG. 1, for pivoting the lower portion 140B of the convergent flap system 140 includes a second bell crank subassembly which comprises: a second bell crank member 31, FIG. 1, that is in fixed relation and connected to the lower portion 140B of the convergent flap system 140 on the port side (FIG. 1) of the engine 200; and, a second bell crank link member 32, FIG. 1, that has a first end 32A, FIG. 1, which is pivotally connected to the second bell crank member 31, and a second end 32B, FIG. 1, that is pivotally connected to the first sliding carriage member 14, FIG. 1.

Still, more specifically, and as a matter of preference and not of limitation, the second means 40, FIG. 2, for pivoting the upper portion 140A of the convergent flap system 140 includes a third bell crank subassembly which comprises: a third bell crank member 41, FIG. 2, that is in fixed relation and connected to the upper portion 140A of the convergent flap system 140 on the starboard side (FIG. 2) of the engine 200; and, a third bell crank link member 42, FIG. 2, having a first end 42A, FIG. 2, that is pivotally connected to the third bell crank member 41, and a second end 42B, FIG. 2, that is pivotally connected to the second sliding carriage member 15, FIG. 2. Similarly, the second means 50, FIG. 2, for pivoting the lower portion 140B of the convergent flap system 140 includes a fourth bell crank subassembly which comprises: a fourth bell crank member 51, FIG. 2, that is in fixed relation and connected to the lower portion 140B of the convergent flap system 140 on the starboard side (FIG. 2) of the engine; and, a fourth bell crank link member 52, FIG. 2, that has a first end 52A, FIG. 2, which is pivotally connected to the fourth bell crank member 51, and a second end 52B, FIG. 2, that is pivotally connected to the second sliding carriage member 15, FIG. 2.

Yet more specifically, and as a matter of preference and not of limitation, the first means 60, FIG. 1, for moving outwardly and/or inwardly the upper portion 150A of the divergent flap system 150 includes: a first slider member 61, FIG. 1, that is attached to the upper portion 160A of the external flap system 160, FIG. 1, and that is slideably movable in a slot 62, FIG. 1, in the upper portion 150A of the divergent flap 150; and, a first link member 63, FIG. 1, that has a first end 63A which is pivotally connected to the upper portion 160A of the external flap system 160 adjacent to the first slider member 61, and a second end 63B that is pivotally connected to the first sliding carriage member 14, FIG. 1. Similarly, the first means 70, FIG. 1, for moving outwardly and/or inwardly the lower portion 150B of the divergent flap system 150 includes: a second slider member 71, FIG. 1, that is attached to the lower portion 160B of the external flap system 160 and that is slideably movable in a slot 72, FIG. 2, in the lower portion 150B of the divergent flap system system 150; and, a second link member 73, FIG. 1, that has a first end 73A, FIG. 1, which is pivotally connected to the lower portion 160B of the external flap system 160 adjacent to the second slider member 71, and a second end 73B that is pivotally connected to the first sliding carriage member 14, FIG. 1.

Still, yet more specifically, and as a matter of preference and not of limitation, the second means 80, FIG. 2, for moving outwardly and/or inwardly the upper portion 150A of the divergent flap system 150 includes: a third slider member 81, FIG. 2, that is attached to the upper portion 160A of the external flap system 160 and that is slideably movable in a slot 82, FIG. 2, in the upper portion 150A of the divergent flap system 150; and, a third link member 83, FIG. 3, having a first end 83A that is pivotally connected to the upper portion 160A of the external flap system 160 adjacent to the third slider member 81, and a second end 83B that is pivotally connected to the second sliding carriage member 15, FIG. 2. Similarly, the second means 90, FIG. 2, for moving outwardly and/or inwardly the lower portion 150B of the divergent flap system 150 includes: a fourth slider member 91, FIG. 2, that is attached to the lower portion 160B of the external flap system 160 and that is slideably movable in a slot 92, FIG. 2, in the lower portion 150B of the divergent flap system 150; and, a fourth link member 93, FIG. 3, that has a first end 93A which is pivotally connected to the lower portion 160B of the external flap system 160 adjacent to the fourth slider member 91, and a second end 93B that is pivotally connected to the second sliding carriage member 15, FIG. 2.

The means 13 may be any suitable conventional means, and itself can be moved either remotely or directly by known, appropriate, conventional means.

MANNER OF OPERATION OF THE PREFERRED EMBODIMENT

The manner of operation of the preferred embodiment 10, FIGS. 1 and 2, of the inventive actuation assembly can be easily ascertained by any person of ordinary skill in the art from the foregoing description, coupled with reference to the contents of the Figures of the drawings. However, it is to be noted that the actuation assembly is ideally suited for use with a convergent-divergent exhaust nozzle that is non-axisymmetrical, i.e., "2D".

For others, it is sufficient to say in explanation that desired variations of throat areas TA, FIGS. 1 and 2, of desired exit areas EA, FIGS. 1 and 2, and of ratios thereof, can be effectuated by either pulling or pushing the means 13, FIGS. 1 and 2, for simultaneously and linearly moving the first and second linear actuator members 11, FIG. 1, and 12, FIG. 2. In that regard, it is to be remembered that in FIG. 1 the actuator moving means 13 has been pulled (i.e., moved to the reader's left), and that in FIG. 2 the actuator moving means 13 has been pushed (i.e., moved to the reader's right).

CONCLUSION

It is abundantly clear from all of the foregoing, and from the contents of the Figures of the drawings, that the stated principal object, as well as related objects, of the invention have been attained.

It is to be noted that, although there have been described and shown the fundamental and unique features of my invention as applied to a preferred embodiment, various other embodiments, variations, adaptations, substitutions, additions, omissions, and the like may occur to, and can be made by, those of ordinary skill in the art, without departing from the spirit of my invention.

What is claimed is:

1. An actuation assembly for a convergent-divergent exhaust nozzle of a gas turbine engine having a longitudinal axis, wherein said nozzle has a longitudinal axis coincident with said longitudinal axis of said engine, a fore end, an aft end, a throat having an area, a convergent flap system with an upper portion and a lower portion, a divergent flap system with an upper portion and a lower portion, an external flap system, with an upper portion and a lower portion, an inner wall, a port side, a starboard side, and an exit having an area, comprising:

a. a first linear actuator member disposed parallel to, and in equal spaced-apart relationship with, said longitudinal axis of said nozzle and external of said inner wall on said port side of said engine, with said first linear actuator member having a first end and a second end;

b. a second linear actuator member disposed parallel to, and in equal spaced-apart relationship with, said longitudinal axis of said nozzle and external of said inner wall on said starboard side of said engine, with said second linear actuator member having a first end and a second end;

c. means, common to said first and second linear actuators, for selectively, simultaneously, and linearly moving said first and second linear actuator members toward said fore end of said nozzle and toward said aft end of said nozzle, with said means connected to said first end of said first linear actuator member and to said first end of said second linear actuator member;

d. a first sliding carriage member disposed parallel to, and in equal spaced-apart relationship with, said longitudinal axis of said nozzle and external of said inner wall on said port side of said engine, with said first sliding carriage member connected to said second end of said first linear actuator member;

e. a second sliding carriage member disposed parallel to, and in equal spaced-apart relationship with, said longitudinal axis of said nozzle and external of said inner wall on said starboard side of said engine, with said second sliding carriage member connected to said second end of said second linear actuator member;

f. first means for pivoting said upper portion of said convergent flap system, with this means disposed external of said inner wall on said port side of said engine, and with this means in fixed relation and connected to said upper portion of said convergent flap and pivotally connected to said first sliding carriage member;

g. first means for pivoting said lower portion of said convergent flap system, with this means disposed external of said inner wall on said port side of said engine, and with this means in fixed relation and connected to said lower portion of said flap and pivotally connected to said first sliding carriage member;

h. second means for pivoting said upper portion of said convergent flap system, with this means disposed external of said inner wall on said starboard side of said engine, and with this means in fixed relation and connected to said upper portion of said convergent flap system and pivotally connected to said second sliding carriage member;

i. second means for pivoting said lower portion of said convergent flap system, with this means disposed external of said inner wall on said starboard side of said engine, and with this means in fixed relation and connected to said lower portion of said flap and pivotally connected to said second sliding carriage member;

j. first means for moving outwardly and inwardly said upper portion of said divergent flap system, with this means disposed external of said inner wall on said port side of said engine, and with this means slideably connected to said upper portion of said divergent flap and pivotally connected to said first sliding carriage member, and pivotally connected to said upper portion of said external flap;

k. first means for moving outwardly and inwardly said lower portion of said divergent flap system, with this means disposed external of said inner wall on said port side of said engine, and with this means slideably connected to said lower portion of said divergent flap system and pivotally connected to said first sliding carriage member, and pivotally connected to said lower portion of said external flap system;

l. second means for moving outwardly and inwardly said upper portion of said divergent flap system, with this means disposed external of said inner wall on said starboard side of said engine, and with this means slideably connected to said upper portion of said divergent flap system and pivotally connected to said second sliding carriage member, and pivotally connected to said upper portion of said external flap system;

m. and, second means for moving outwardly and inwardly said lower portion of said divergent flap system, with this means disposed external of said inner wall on said starboard side of said engine, and with this means slideably connected to said lower portion of said divergent flap system and pivotally connected to said second sliding carriage member, and pivotally connected to said lower portion of said external flap system;

whereby when said means for selectively, simultaneously, and linearly moving said first and second linear actuator members is moved toward said fore end of said exhaust nozzle, thereby said upper and lower portions of said convergent flap are pivoted and said upper and lower portions of said divergent flap system are moved inwardly, and thereby said throat area is at a minimum and simultaneously the minimum desired exit area is achieved;

and whereby when said means for selectively, simultaneously, and linearly moving said first and second linear actuator members is moved toward said aft end of said exhaust nozzle, thereby said upper and lower portions of said convergent flap are pivoted and said upper and lower portions of said divergent flap are moved outwardly, and thereby said throat area is at a maximum and simultaneously the maximum desired exit area is achieved;

and also whereby the length of linear movement of said means for selectively, simultaneously, and linearly moving said first and second linear actuator members to attain said minimum throat area, or to attain said minimum exit area, is the same;

and also whereby the length of linear movement at this means for selectively, simultaneously, and linearly moving said first and second linear actuator members to attain said maximum throat area, or to attain said maximum exit area, is the same;

2. An actuation assembly, as set forth in claim 1, wherein said first means for pivoting said upper portion of said convergent flap system includes a first bell crank subassembly which comprises:
   a. a first bell crank member in fixed relation and connected to said upper portion of said convergent flap system on said port side of said engine;
   b. and, a first bell crank link member having a first end pivotally connected to said first bell crank member and a second end pivotally connected to said first sliding carriage member.

3. An actuation assembly, as set forth in claim 2, wherein said first means for pivoting said lower portion of said convergent flap system includes a second bell crank subassembly which comprises:
   a. a second bell crank member in fixed relation and connected to said lower portion of said convergent flap system on said port side of said engine;
   b. and, a second bell crank link member having a first end pivotally connected to said second bell crank member and a second end pivotally connected to said first sliding carriage member.

4. An actuation assembly, as set forth in claim 3, wherein said second means for pivoting said upper portion of said convergent flap system includes a third bell crank subassembly which comprises:
   a. a third bell crank member in fixed relation and connected to said upper portion of said convergent flap system on said starboard side of said engine;
   b. and, a third bell crank link member having a first end pivotally connected to said third bell crank member and a second end pivotally connected to said second sliding carriage member.

5. An actuation assembly, as set forth in claim 4, wherein said second means for pivoting said lower portion of said convergent flap system includes a fourth bell crank subassembly which comprises:
   a. a fourth bell crank member in fixed relation and connected to said lower portion of said convergent flap system on said starboard side of said engine;
   b. and, a fourth bell crank link member having a first end pivotally connected to said fourth bell crank member and a second end pivotally connected to said second sliding carriage member.

6. An actuation assembly, as set forth in claim 5, wherein said first means for moving outwardly and inwardly said upper portion of said divergent flap system includes:

a. a first slider member attached to said upper portion of said external flap system and slideably movable in a slot in said upper portion of said divergent flap system;

b. and, a first link member having a first end pivotally connected to said upper portion of said external flap system adjacent said first slider member, and a second end pivotally connected to said first sliding carriage member.

7. An actuation assembly, as set forth in claim 6, wherein said first means for moving outwardly and inwardly said lower portion of said divergent flap system includes:

a. a second slider member attached to said lower portion of said external flap system and slideably movable in a slot in said lower portion of said divergent flap system;

b. and, a second link member having a first end pivotally connected to said lower portion of said external flap adjacent said second slider member, and a second end pivotally connected to said first sliding carriage member.

8. An actuation assembly, as set forth in claim 7, wherein said second means for moving outwardly and inwardly said upper portion of said divergent flap system includes:

a. a third slider member attached to said upper portion of said external flap system and slideably movable in a slot in said upper portion of said divergent flap system;

b. and, a third link member having a first end pivotally connected to said upper portion of said external flap system adjacent said third slider member, and a second end pivotally connected to said second sliding carriage member.

9. An actuation assembly, as set forth in claim 8, wherein said second means for moving outwardly and inwardly said lower portion of said divergent flap system includes:

a. a fourth slider member attached to said lower portion of said external flap system and slideably movable in a slot in said lower portion of said divergent flap system;

b. and, a fourth link member having a first end pivotally connected to said lower portion of said external flap system adjacent said fourth slider member, and a second end pivotally connected to said second sliding carriage member.

* * * * *